US008107514B2

(12) United States Patent
Lee et al.

(10) Patent No.: US 8,107,514 B2
(45) Date of Patent: Jan. 31, 2012

(54) DECODING METHOD FOR SPACE-TIME ENCODING TRANSMISSION SCHEME IN WITH MULTIPLE INPUT MULTIPLE OUTPUT SYSTEM AND RECEIVING APPARATUS FOR USING THE METHOD

(75) Inventors: Seung-Joon Lee, Daejeon (KR); Dong-Seung Kwon, Daejeon (KR); Seong-Rag Kim, Daejeon (KR); In-Kyeong Choi, Daejeon (KR)

(73) Assignees: Samsung Electronics Co., Ltd., Suwon-si (KR); Electronics and Telecommunications Research Institute, Daejeon (KR); KT Corporation, Seongnam (KR); SK Telecom Co., Ltd, Seoul (KR); KTFreetel Co., Ltd., Seoul (KR); Hanaro Telecom, Inc., Seoul (KR)

( * ) Notice: Subject to any disclaimer, the term of this patent is extended or adjusted under 35 U.S.C. 154(b) by 1268 days.

(21) Appl. No.: 11/721,110

(22) PCT Filed: Dec. 9, 2005

(86) PCT No.: PCT/KR2005/004230
§ 371 (c)(1),
(2), (4) Date: Jun. 7, 2007

(87) PCT Pub. No.: WO2006/062381
PCT Pub. Date: Jun. 15, 2006

(65) Prior Publication Data
US 2010/0215085 A1     Aug. 26, 2010

(30) Foreign Application Priority Data

Dec. 11, 2004  (KR) .................... 10-2004-0104606
Nov. 23, 2005  (KR) .................... 10-2005-0112205

(51) Int. Cl.
*H04B 1/38* (2006.01)
(52) U.S. Cl. ...................................................... 375/219
(58) Field of Classification Search .................. 375/219, 375/240, 265, 267, 316
See application file for complete search history.

(56) References Cited

U.S. PATENT DOCUMENTS

| 6,891,897 B1 * | 5/2005 | Bevan et al. ................. 375/265 |
| 2004/0066739 A1 | 4/2004 | Ouyang et al. |
| 2004/0072594 A1 | 4/2004 | Hwang et al. |

(Continued)

FOREIGN PATENT DOCUMENTS

KR    10-2004-0032730 A     4/2004

(Continued)

OTHER PUBLICATIONS

Siavash M. Alamouti. "A Simple transmit Diversity Technique for wireless communications." IEEE Journal on Select Areas in Communications, vol. 16, No. 8, Oct. 1998. pp. 1451-1459.

*Primary Examiner* — David C. Payne
*Assistant Examiner* — Leon-Viet Nguyen
(74) *Attorney, Agent, or Firm* — Jefferson IP Law, LLP (57) ABSTRACT

A receiver according to an exemplary embodiment of the present invention receives a transmitted signal, converts the signal to a predetermined symbol, and estimates channel information including a channel gain of a channel of the transmitted signal. In addition, the receiver generates an intermediate processing value for decoding the signal based on the estimated channel information and the symbol, and normalizes the intermediate processing value to the channel gain to generate a reference value. The generated reference value is used for a soft-decision value for decoding the signal. In addition, when the signal is decoded by using a hard-decision value, a constellation point value that is closest to the reference values is generated and set as the hard-decision value.

18 Claims, 5 Drawing Sheets

U.S. PATENT DOCUMENTS

2005/0135500 A1 6/2005 Nam et al.
2005/0249306 A1 11/2005 Chae et al.

FOREIGN PATENT DOCUMENTS

| KR | 10-2006-0047746 A | 5/2005 |
| KR | 10-2005-0065295 A | 6/2005 |
| KR | 10-2006-0043279 A | 5/2006 |
| WO | 2005/109723 A2 | 11/2005 |
| WO | 2006/025635 A1 | 3/2006 |

* cited by examiner

DECODING METHOD FOR SPACE-TIME ENCODING TRANSMISSION SCHEME IN WITH MULTIPLE INPUT MULTIPLE OUTPUT SYSTEM AND RECEIVING APPARATUS FOR USING THE METHOD

BACKGROUND OF THE INVENTION (a) Field of the Invention

The present invention relates to a decoding method and a receiver using the decoding method. More particularly, the present invention relates to a method for decoding a signal and a receiver using the method when a transmitter transmits the signal by using a plurality of antennas in an Alamouti space-time encoding scheme, in a multiple input multiple output (MIMO) system for transmitting/receiving the signal by using a plurality of antennas.

(b) Description of the Related Art

Recently, requirements of various communication services have increased, since information and communication services have been popularized and high quality multimedia services have been introduced. Accordingly, it is required to increase capacity of communication systems, and more specifically, of wireless communication systems rather than wired communication systems.

Basically, available frequency resources must be shared since they are limited in the wireless communication environment. To increase the capacity in communication systems in the wireless communication environment, a method for finding available frequency bandwidths and a method for increasing efficiency of given resources are used. Among those methods, a space-time coding method for increasing radio resource efficiency has been actively studied, in which reliability of communication links is increased by a diversity gain without increasing bandwidth since a plurality of antennas are provided to a transmitter and a receiver to obtain additional space for resource application, and a data rate is increased by performing parallel transmission in a spatial multiplexing method.

A space-time block encoding method suggested by Alamouti in a publication entitled "A simple transmit diversity technique for wireless communications" IEEE J SAC, vol. 16, no. 8, in October 1998, is a representative transmission diversity method for preventing radio channel fading by using a plurality of antennas in a transmitter and a receiver. In the above method, two transmitting antennas are used to receive a maximized diversity gain, in which a diversity order is a product of the number of transmitting antennas and the number of receiving antennas.

In addition to the space-time block encoding method, a decoding method thereof has also been suggested in the above method by Alamouti. The suggested decoding method is to obtain maximum performance of a maximum likelihood decoding method. While a transmitter concurrently transmits two symbols, it is not necessary to concurrently decode the two symbols since the two symbols are separately decoded in the decoding method. However, every constellation point of each symbol has to be searched in a process for decoding the respective symbols. Therefore, there is a problem in that complexity in realizing a decoder for searching the constellation point is increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for decoding a signal when a signal encoded in an Alamouti space-time encoding method is transmitted in a multiple input and multiple output system using a plurality of antennas, and a receiver using the method to obtain optimized performance and to minimize complexity in realizing the method.

An exemplary method according to an embodiment of the present invention is to decode a received signal of predetermined data in a multiple input multiple output system including a plurality of transmitting antennas and a plurality of receiving antennas when the signal encoded in an Alamouti space-time encoding method is transmitted by using the plurality of transmitting antennas. In the exemplary method, the transmitted signal is received, the signal is converted to a predetermined symbol, channel information including a channel gain of a channel of the transmitted signal is estimated, an intermediate processing value for decoding the signal is generated based on the estimated channel information and the symbol, the intermediate processing value is normalized to the channel gain to generate a reference value, and the signal is decoded based on the reference value.

In addition, the reference value may be set as a soft-decision value for the decoding of the signal, and the signal is decoded based on the soft-decision value to restore original data of the signal. In addition, a hard-decision value may be generated based on the reference value, and the signal is decoded based on the hard-decision value to restore the original data of the signal.

An exemplary receiver according to an embodiment of the present invention receives a transmitted signal through a plurality of receiving antennas, converts the signal to a predetermined symbol, and decodes the signal in a multiple input multiple output system having the plurality of receiving antennas and a plurality of transmitting antennas when the signal of predetermined data is transmitted through a plurality of transmitting antennas based on an Alamouti space-time encoding method. The exemplary receiver includes a channel estimator, a combiner, and a decoder. The channel estimator estimates channel information including a channel gain of a channel of the transmitted signal. The combiner generates an intermediate processing value for decoding the signal based on the estimated channel information and the symbol. The decoder normalizes the intermediate value to the channel gain, generates the reference value of the received signal, sets the reference value as a soft-decision value for decoding the signal, decodes the signal based on the soft-decision value, and restores original data of the signal.

An exemplary receiver according to another embodiment of the present invention receives a transmitted signal through a plurality of receiving antennas, converts the signal to a predetermined symbol, and decodes the signal in a multiple input multiple output system having the plurality of receiving antennas and a plurality of transmitting antennas when the signal of predetermined data is transmitted through a plurality of transmitting antennas based on an Alamouti space-time encoding method. The exemplary receiver includes a channel estimator, a combiner, and a decoder. The channel estimator estimates channel information including a channel gain of a channel of the transmitted signal. The combiner generates an intermediate processing value for decoding the signal based on the estimated channel information and the symbol. The decoder generates a reference value based on the intermediate processing value, generates a hard-decision value based on the reference value, and decodes the signal based on the hard-decision value.

The decoder includes a reference value generating module for normalizing the intermediate processing value to the channel gain and generating the reference value of the signal, a constellation point generating module for generating a constellation point imaginary number that is closest to an imaginary number of the reference value and a constellation point real number that is closest to a real number of the reference value, a hard-decision value setting module for setting, the constellation point imaginary number as a hard-decision value of an imaginary number of the signal and the constellation point real number as a hard-decision value of a real number of the signal, and a decoding module for decoding the signal based on the hard-decision values of the imaginary and real numbers to restore original data.

When the number of transmitting antennas is 2, and $S_1$ and $S_2$ respectively denote signals transmitted through the respective transmitting antennas, the reference values of the signals are generated as shown in the following math figure:

$$y_1 = \frac{v_1}{\sum_{i=1}^{M}\left(|\hat{h}_{i1}|^2 + |\hat{h}_{i2}|^2\right)}$$

$$y_2 = \frac{v_2}{\sum_{i=1}^{M}\left(|\hat{h}_{i1}|^2 + |\hat{h}_{i2}|^2\right)},$$

where $y_1$ denotes the reference value of the signal $S_1$ received by an $i^{th}$ receiving antenna, $y_2$ denotes the reference value of the signal $S_2$ received by the $i^{th}$ receiving antenna, $v_1$ denotes the intermediate processing value of the signal $S_1$ received by the $i^{th}$ receiving antenna, $v_2$ denotes the intermediate processing value of the signal $S_2$ received by the $i^{th}$ receiving antenna, and $\hat{h}_{ij}$ denotes a channel gain estimate value between the $i^{th}$ receiving antenna and a $j^{th}$ transmitting antenna.

DETAILED DESCRIPTION OF THE EMBODIMENTS

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention.

In addition, throughout this specification and the claims which follow, unless explicitly described to the contrary, the word "comprise" or variations such as "comprises" or "comprising" will be understood to imply the inclusion of stated elements but not the exclusion of any other elements.

In addition, the word "module" will be understood to indicate a unit for processing a predetermined function or operation, which may be realized by hardware, software, or a combination thereof.

In a decoding method according to an exemplary embodiment of the present invention, a maximized performance may be obtained with less complexity in a multiple input multiple output system for increasing system reliability and a data rate by using a plurality of antennas in a transmitter and a receiver, when a quadrature amplitude modulation signal processed in an Alamouti space-time encoding method is received and decoded.

Figure 1:
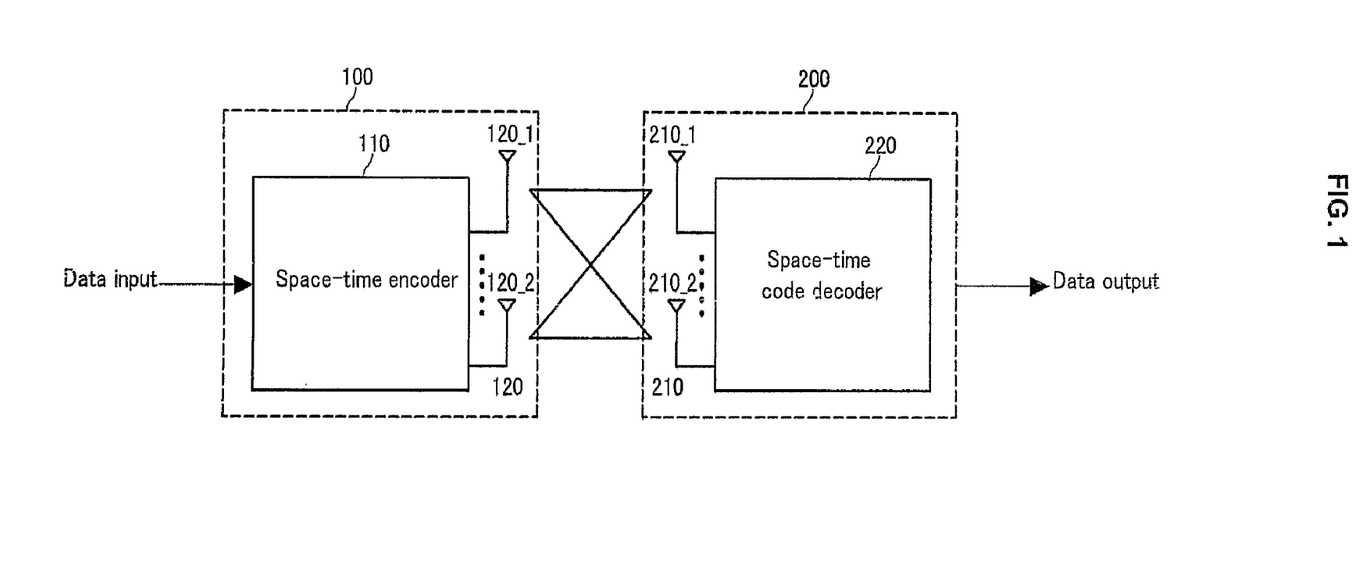
FIG. 1 shows a diagram of a configuration of the multiple input multiple output system using a space-time encoding method according to an exemplary embodiment of the present invention.

FIG. 1 shows a diagram of a configuration of the multiple input multiple output system having a plurality of antennas, the multiple input multiple output system transmitting a signal by using a space-time encoding method and receiving the transmitted signal according to an exemplary embodiment of the present, invention.

As shown in FIG. 1, the multiple input multiple output system according to the exemplary embodiment of the present invention includes a transmitter 100 for encoding a signal by using a space-time encoding method for obtaining a maximized diversity gain, and transmitting the encoded signal through N (N=1, 2, . . . ) transmitting antennas, and a receiver 200 for receiving the signal through M (M=1, 2, . . . ) receiving antennas, decoding the signal according to the exemplary embodiment of the present invention, and detecting an information symbol.

The transmitter 100 includes a space-time encoder 110 and a plurality of transmitting antennas 120_1, . . . , 120_2 (hereinafter, denoted by 120 for convenience of description). The space-time encoder 110 generates a space-time code from an input data symbol block, and transmits the space-time code to the receiver 200 through the plurality of transmitting antennas 120. More specifically, according to the exemplary embodiment of the present invention, two transmitting antennas 120 are used to transmit the signal, and the space-time encoder 110 encodes data received every t times so that the data are block-decoded by two symbols, and the space-time encoder 110 outputs the data symbol. The signal is modulated in a quadrature amplitude modulation (QAM) method which is one method among digital multi-level modulation methods, in which modulation is executed with the combination of an amplitude and a phase of a carrier.

In addition, the receiver 200 includes a plurality of receiving antennas 210_1, . . . , 210_2, (hereinafter, denoted by 210 for convenience of description) and a space-time code decoder 220 (also referred to as a "decoder" for convenience of description). The space-time decoder 220 receives the signal through the plurality of receiving antennas 210, decodes the signal in a decoding method according to the exemplary embodiment of the present invention, and restores the data symbol transmitted by the transmitter 100.

The space-time code decoder 220 of the receiver 200 decodes the transmitted signal based on a soft decision value or hard decision value.

The decoding method according to the exemplary embodiment of the present invention will now be described.

Hereinafter, it will be assumed that the number of transmitting antennas is 2, and the number of receiving antennas is a predetermined number M (M≧1). In addition, $h_{ij}$ denotes a channel gain between an $i^{th}$ receiving antenna and a $j^{th}$ transmitting antenna.

When $S_1$ and $S_2$ denotes two symbols to be transmitted by an Alamouti space-time encoded block of a transmitting apparatus, $S_1$ and $S_2$ are transmitted through a first transmitting antenna and a second transmitting antenna at a time slot t, and $-S^*_2$ and $S^*_1$ are transmitted through the first transmitting antenna and the second transmitting antenna at a subsequent time slot t+1. ( )* denotes a complex conjugate. Table 1 shows an Alamouti transmitting method, in which signals are encoded in the space and time domains.

TABLE 1

|  | Transmitting antenna 1 | Transmitting antenna 2 |
|---|---|---|
| time t | $S_1$ | $S_2$ |
| time t + T | $-S^*_2$ | $-S^*_1$ |

A signal $r_i(t)$ received by an $i^{th}$ receiving antenna at a first time slot t and a signal $r_i(t+1)$ received by the $i^{th}$ receiving antenna at a second time slot t+1 are shown as Math Figure 1. $n_i(t)$ and $n_i(t+1)$ in Math Figure 1 respectively denote additive white Gaussian noise (AWGN).

$$r_i(t) = h_{i1}s_1 + h_{i2}s_2 + n_i(t)$$

$$r_i(t+1) = -h_{i1}s^*_2 + s^*_1 + n_i(t+1)$$ [Math Figure 1]

Figure 2:
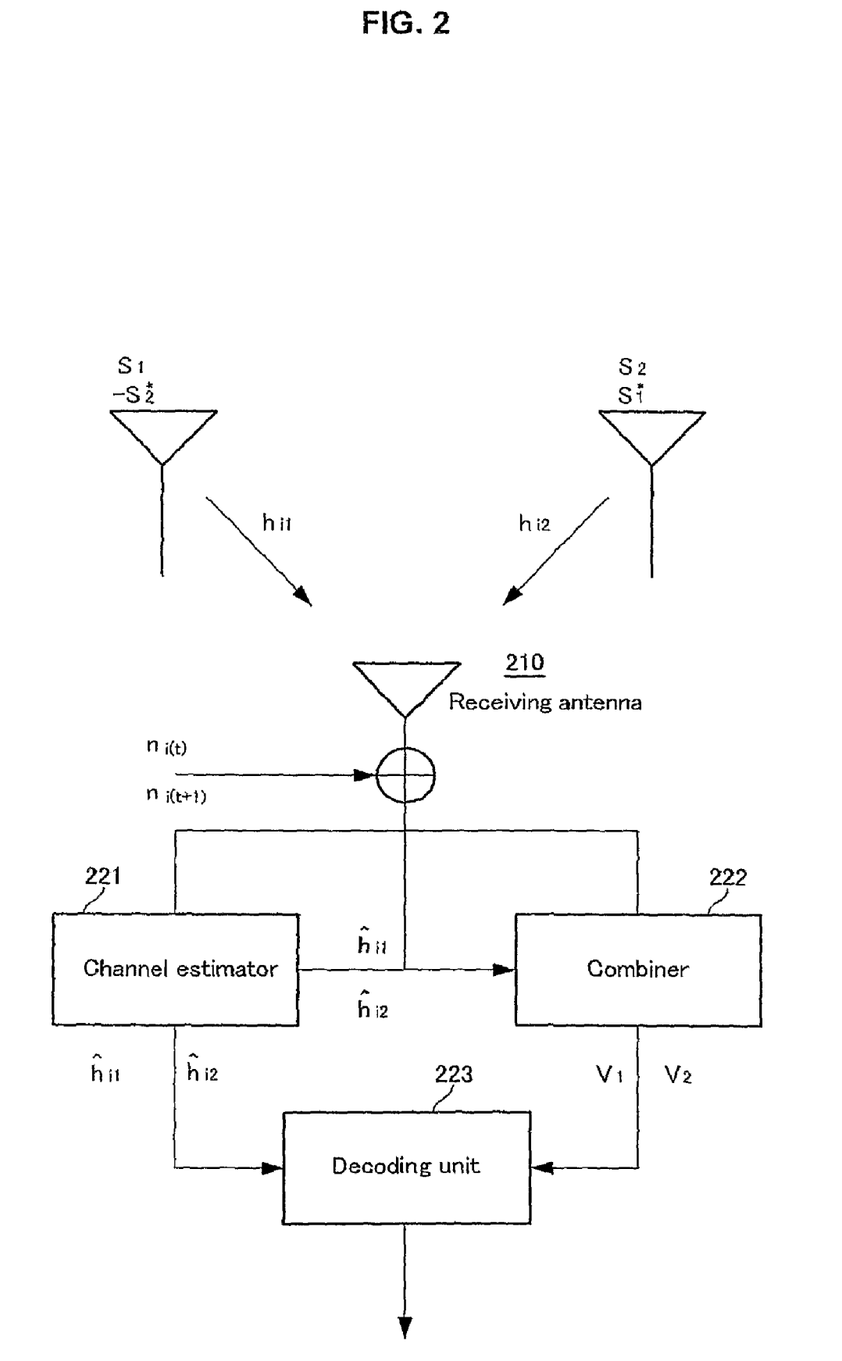
FIG. 2 shows a diagram of a configuration of a receiver according to a first exemplary embodiment of the present invention.

Intermediate processing values $v_1$ and $v_2$ to be input to a decoder based on estimated channel information and the received signal are calculated as shown in Math Figure 2.

$$v_1 = \sum_{i=1}^{M} \left( \hat{h}^*_{i1} r_i(t) + \hat{h}_{i2} r^*_i(t+1) \right)$$ [Math Figure 2]

$$v_2 = \sum_{i=1}^{M} \left( \hat{h}^*_{i2} r_i(t) - \hat{h}_{i1} r^*_i(t+1) \right)$$

$\hat{h}^*_{i1}$ and $\hat{h}^*_{i2}$ in Math Figure 2 respectively denote estimate values of $h_{i1}$ and $h_{i2}$.

Figure 3:
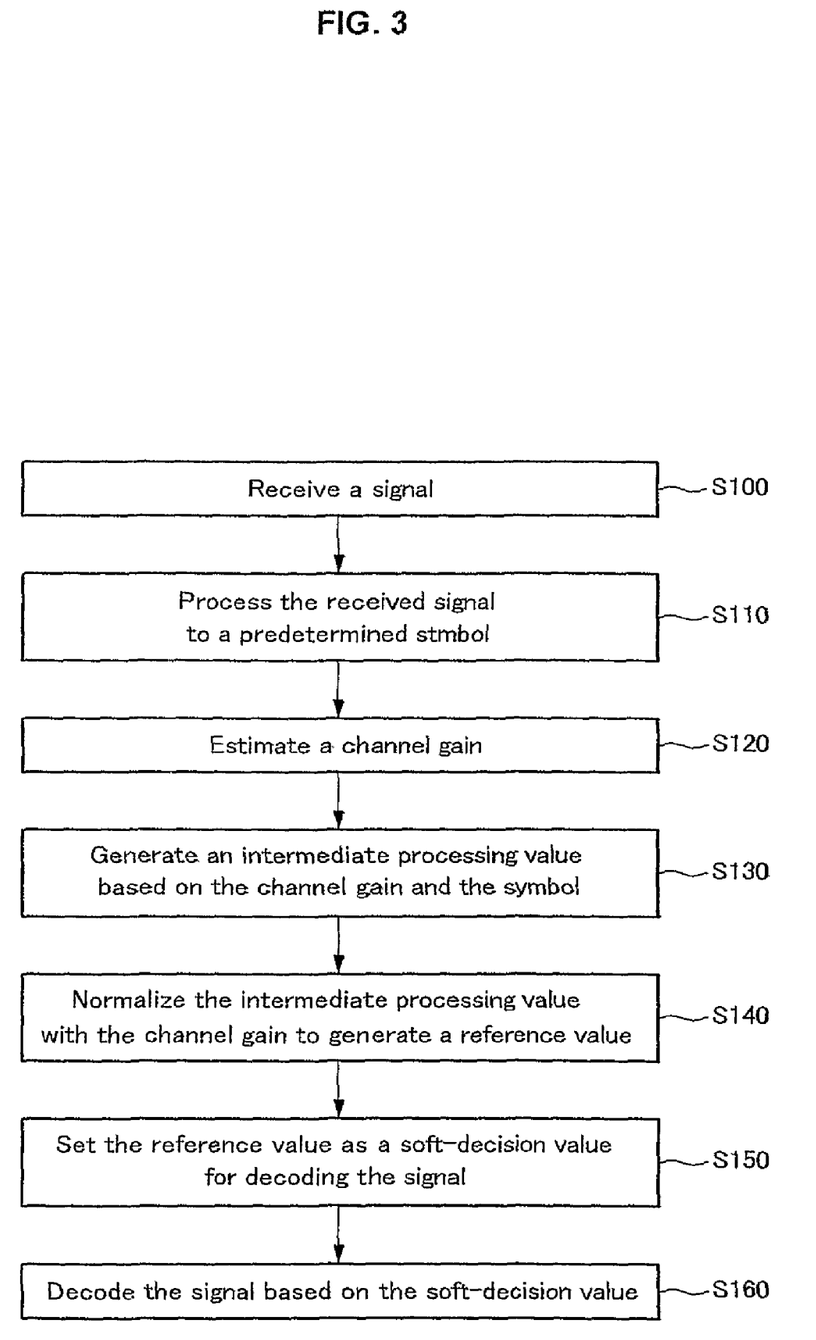
FIG. 3 shows a flowchart of a decoding method according to the first exemplary embodiment of the present invention.

$v^1$ and $v^2$ are normalized with a channel gain, and reference values $y_1$ and $y_2$ are obtained as shown in Math Figure 3.

$$y_1 = \frac{v_1}{\sum_{i=1}^{M} \left( |\hat{h}_{i1}|^2 + |\hat{h}_{i2}|^2 \right)}$$ [Math Figure 3]

$$y_2 = \frac{v_2}{\sum_{i=1}^{M} \left( |\hat{h}_{i1}|^2 + |\hat{h}_{i2}|^2 \right)}$$

$y_1$ and $y_2$ are used as soft-decision values of the transmitting signals $S_1$ and $S_2$. That is, when the decoder according to the exemplary embodiment of the present invention decodes a signal based on the soft-decision values, $y_1$ and $y_2$ calculated as shown in Math Figure 3 are used as the soft-decision values of the transmitting signals $S_1$ and $S_2$ to decode the signals.

In addition, when the decoder according to the exemplary embodiment of the present invention decodes the signal based on a hard-decision value, the hard-decision value of the transmitting signal $S_1$ is calculated from a constellation point that is closest to $y_1$, and the hard-decision value of the transmitting signal $S_2$ is calculated from a constellation point that is closest to $y_2$. The hard-decision values of the transmitting signals $S_1$ and $S_2$ may be simply obtained as shown in Math Figure 4 since the transmitting signals $S_1$ and $S_2$ are QAM signals.

Figure 4:
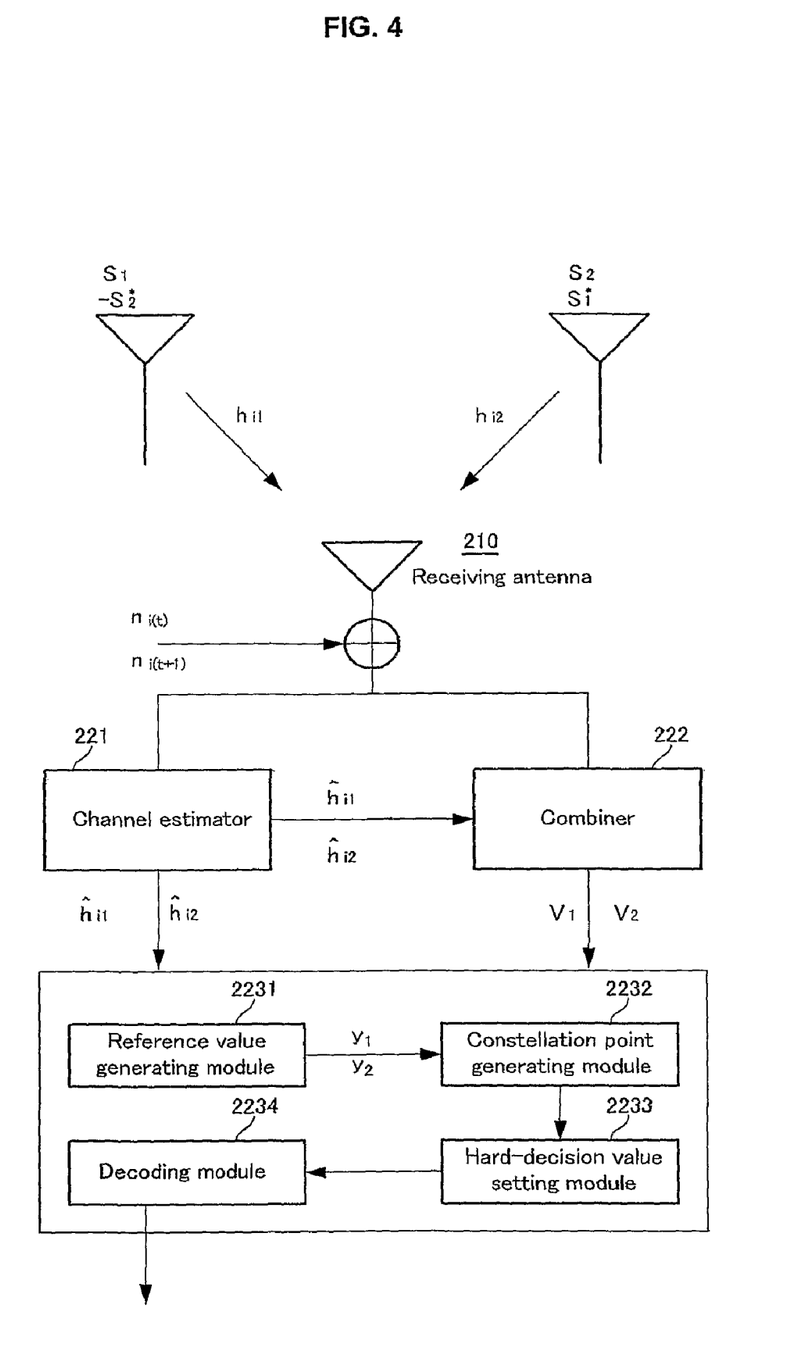
FIG. 4 shows a diagram of a configuration of a receiver according to a second exemplary embodiment of the present invention.

[Math Figure 4]

Hard decision value on real number of $S_1$=Real number constellation point close to real number of $y_1$ Hard decision value on imaginary number of $S_1$=Imaginary number constellation point close to imaginary number of $y_1$ Hard decision value on real number of $S_2$=Real number constellation point close to real number of $y_2$ Hard decision value on imaginary number of $S_2$=Imaginary number constellation point close to imaginary number of $y_2$ After $y_1$ and $y_2$ are determined as the soft-decision values of the transmitting signals $S_1$ and $S_2$, or the values calculated as shown in Math Figure 4 are determined as the hard-decision values of the transmitting signals $S_1$ and $S_2$, the signal is decoded based on the soft-decision value or the hard-decision value to restore original data. A method for decoding the signal based on the soft-decision value or the hard-decision value has been disclosed in the prior art, and therefore detailed descriptions thereof will be omitted.

According to the exemplary embodiment of the present invention, since the constellation point of a corresponding symbol is easily calculated as shown in Math Figure 3 and Math Figure 4 so as to decode the symbol without searching all the constellation points of the respective symbols in a process for decoding the symbols, complexity in realizing a decoding method may be greatly reduced. That is, the complexity in realizing the conventional decoder is greater than the same according to the exemplary embodiment of the present invention since the soft-decision value or the hard-decision value is obtained, rather than using Math Figure 3, from a complex signal process value when a signal encoded in the conventional Alamouti space-time coding method is decoded. Therefore, in the decoding method according to the exemplary embodiment of the present invention, a Maximum-Likelihood performance may be obtained while reducing the complexity in realizing the decoder.

A receiver for receiving and decoding the signal based on the decoding method according to the exemplary embodiment of the present invention will now be described.

FIG. 2 shows a diagram of a configuration of the receiver for decoding the signal based on the soft-decision value according to a first exemplary embodiment of the present invention, and a configuration of the decoder 220 is illustrated in detail in FIG. 2.

As shown in FIG. 2, the receiver 200 according to the first exemplary embodiment of the present invention includes the receiving antenna 210 and the decoder 220. The decoder 220 includes a channel estimator 221 for estimating channel information, a combiner 222 for combining the channel information and the received signal to generate an intermediate processing value for decoding the signal, and a decoding unit 223 for decoding the signal based on the intermediate processing value to obtain original data. While it has been described that the channel estimator 221 is included in the decoder 220, the channel estimator 221 may be provided separately from the decoder 220. A method for estimating a channel state and obtaining a channel gain has been disclosed in the prior art, and therefore detailed descriptions thereof will be omitted.

An operation of the receiver according to the first exemplary embodiment of the present invention will be described based on the above configuration.

FIG. 3 shows a flowchart of the decoding method according to the first exemplary embodiment of the present invention.

The decoder 220 of the receiver according to the first exemplary embodiment of the present invention decodes the signal based on the soft-decision value. When the transmitter 100 encodes data by every two symbols in the space-time encoding method and transmits a signal through the transmitting antenna 120 as shown in FIG. 2 and FIG. 3, the receiving antenna 210 of the receiver 200 receives the signal in step S100.

The signal received through the receiving antenna 210 is processed as a predetermined symbol and input to the combiner 222 in step S110, and a channel gain of a channel of the signal is estimated by the channel estimator 221 based on the received signal in step S120.

An intermediate processing value for decoding the signal is generated by the combiner 222 based on estimated channel information (i.e., the channel gain and the symbol) in step S130. That is, the intermediate processing values $v_1$ and $v_2$ are generated by using Math Figure 2.

The generated intermediate processing values $v_1$ and $v_2$ are input to the decoding unit 223, and normalized to a channel gain by the decoding unit 223 to generate the reference values $y_1$ and $y_2$ as shown in Math Figure 3 in step S140. The decoding unit 223 sets the reference values $y_1$ and $y_2$ as the soft-decision value in step S150, and decodes the signal based on the soft-decision value to restore the original data of the signal in step S160.

According to the first exemplary embodiment of the present invention, since the intermediate processing value generated based on the channel gain and the symbol of the signal is normalized with the channel gain to generate the soft-decision value for decoding the signal by using the generated reference values, the decoding method and an apparatus for realizing the decoding method may be simplified.

In addition, an operation of the receiver 200 including a decoding unit for In decoding a signal based on the hard-decision value will now be described.

Figure 5:
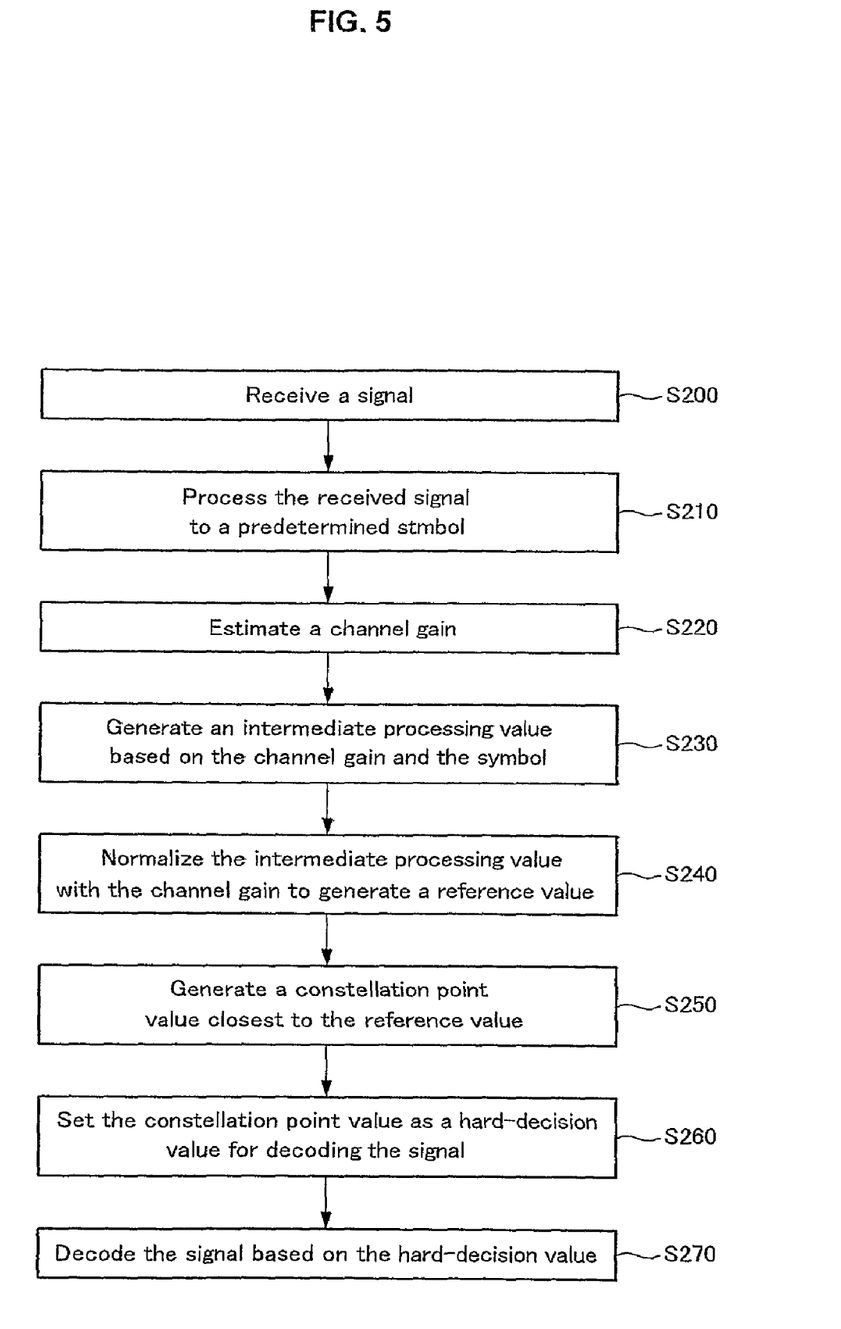
FIG. 5 shows a flowchart representing a decoding method according to the second exemplary embodiment of the present invention.

FIG. 4 shows a diagram of a configuration of the receiver according to a second exemplary embodiment of the present invention, and FIG. 5 shows a flowchart representing a decoding method according to the second exemplary embodiment of the present invention.

As shown in FIG. 4, the receiver 200 according to the second exemplary embodiment of the present invention includes the receiving antenna 210 and the decoder 220, and in a like manner of the first exemplary embodiment of the present invention, the decoder 220 includes the channel estimator 221, the combiner 222, and a decoding unit 223'. However, differing from the first exemplary embodiment of the present invention, the decoding unit 223' decodes the signal based on the hard-decision value. Accordingly, the decoding unit 223' includes a reference value generating module 2231 for normalizing the intermediate value to the channel gain and generating the reference value of the received signal, a constellation point generating module 2232 for generating a constellation point imaginary number value that is closest to an imaginary number of the reference value and a constellation point real number value that is closest to a real number of the reference value, a hard-decision value setting module 2233 for setting the constellation point imaginary number value as a hard-decision value of the imaginary number of the signal and the constellation point real number value as a hard-decision value of the real number of the signal, and a decoding module 2234 for decoding the signal based on the hard-decision values of the imaginary and real numbers and restoring the original data of the signal.

In a like manner of the first exemplary embodiment of the present invention, the receiver according to the second exemplary embodiment of the present invention receives the transmitted signal through the receiving antenna 210, processes the signal to a predetermined symbol, and estimates a channel gain of the channel of the signal as shown in FIG. 5. In addition, the intermediate processing values $v_1$ and $v_2$ for decoding the signal based on the estimated channel gain and the symbol are generated, and are normalized with the channel gain to generate the reference values $y_1$ and $y_2$ as shown in Math Figure 3 in steps S200 to S240.

Differing from the first exemplary embodiment of the present invention, the constellation point generating module 2232 of the decoding unit 223' generates the constellation point imaginary number value that is closest to the imaginary number of the reference value and the constellation point real number value that is closest to the real number of the reference value in step S250, and the hard-decision value setting module 2233 sets the constellation point imaginary number value as a hard-decision value of the imaginary number of the signal and the constellation point real number value as a hard-decision value of the real number of the signal. That is, the hard-decision value setting module 2233 sets the hard-decision value of the signal by using Math Figure 4 in step S260.

The decoding module 2234 decodes the signal based on the hard-decision value of the imaginary number and the hard-decision value of the real number, and restores the original data of the received signal in step S270.

According to the second exemplary embodiment of the present invention, since the intermediate processing value generated based on the channel gain and the symbol of the signal is normalized with the channel gain to generate the hard-decision value for decoding the signal by using the generated reference values, the decoding method and the apparatus for realizing the decoding method may be simplified.

The above method may be realized as a program recorded in a computer-readable recording medium. Various kinds of recoding devices may be used for the recording medium if the recoding devices are readable on a computer. For example, a CD-ROM, magnetic tape, or a floppy disk may be used for the recoding medium, and the recoding medium may be realized as a carrier wave type (e.g., transmission through the Internet).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, in the multiple input multiple output system for transmitting/receiving the signal to through the plurality of antennas of the transmitter and the receiver, the complexity in realizing the decoding method may be reduced compared to the conventional decoding method, and optimized performance may be obtained, when data are encoded in the Alamouti space-time encoding method, a predetermined signal is transmitted by the transmitter through a plurality of transmitting antennas, and the signal is received and decoded by the receiver.

In more detail, the hard-decision decoding method or the soft-decision decoding method with the optimized performance may be simply used when a QAM signal is encoded in the Alamouti space-time encoding method and transmitted in a system having two transmitting antennas and a predetermined number (more than one) of receiving antennas. In addition, when an area of the QAM signal is increased, the complexity of the decoding method according to the exemplary embodiment of the present invention may not be increased.

What is claimed is:

1. A method for receiving and decoding a signal of predetermined data in a multiple input multiple output system including a plurality of transmitting antennas and a plurality of receiving antennas, the signal transmitted by using a plurality of transmitting antennas based on an Alamouti space-time encoding method, the method comprising:
   receiving the transmitted signal and converting the signal to a predetermined symbol;
   estimating channel information including a channel gain of a channel of the transmitted signal;
   generating an intermediate processing value for decoding the signal based on the estimated channel information and the symbol;
   normalizing the intermediate processing value with the channel gain to generate a reference value; and
   decoding the signal based on the reference value,
   wherein the intermediate processing value is a summation from 1 to M, and
   wherein M is a number of the plurality of the receiving antennas.

2. The method of claim 1, wherein the decoding of the signal comprises:
   setting the reference value as a soft-decision value for the decoding of the signal; and
   decoding the signal based on the soft-decision value to restore original data of the signal.

3. The method of claim 1, wherein the decoding of the signal comprises:
   a) generating a hard-decision value based on the reference value; and
   b) decoding the signal based on the hard-decision value to restore original data of the signal.

4. The method of claim 3, wherein:
   a) comprises generating an imaginary number of a constellation point that is closest to an imaginary number of the reference value and a real number of the constellation point that is closest to a real number of the reference value, setting the imaginary number of the constellation point as the hard-decision value of an imaginary number of the signal, and setting the real number of the constellation point as the hard-decision value of a real number of the signal; and
   b) comprises decoding the signal based on the hard-decision values of the imaginary number and the real number to restore the original data.

5. The method of claim 1, wherein, when the number of transmitting antennas is 2, and $S_1$ and $S_2$ respectively denote signals transmitted through the respective transmitting antennas, the reference values of the signals are generated as shown in the following math figure:

$$y_1 = \frac{v_1}{\sum_{i=1}^{M}\left(|\hat{h}_{i1}|^2 + |\hat{h}_{i2}|^2\right)}$$

$$y_2 = \frac{v_2}{\sum_{i=1}^{M}\left(|\hat{h}_{i1}|^2 + |\hat{h}_{i2}|^2\right)},$$

where $y_1$ denotes the reference value of the signal $S_1$ received by an $i^{th}$ receiving antenna, $y_2$ denotes the reference value of the signal $S_2$ received by the $i^{th}$ receiving antenna, $v_1$ denotes the intermediate processing value of the signal $S_1$ received by the $i^{th}$ receiving antenna, $v_2$ denotes the intermediate processing value of the signal $S_2$ received by the $i^{th}$ receiving antenna, and $\hat{h}_{ij}$ denotes a channel gain estimate value between the $i^{th}$ receiving antenna and a $j^{th}$ transmitting antenna.

6. The method of claim 1, wherein the intermediate processing value of the signal is generated as shown in the following math figure:

$$v_1 = \sum_{i=1}^{M}\left(\hat{h}_{i1}^* r_i(t) + \hat{h}_{i2} r_i^*(t+1)\right)$$

$$v_2 = \sum_{i=1}^{M}\left(\hat{h}_{i2}^* r_i(t) - \hat{h}_{i1} r_i^*(t+1)\right),$$

where $v_1$ denotes the intermediate processing value of the signal $S_1$ received by the $i^{th}$ receiving antenna, $v_2$ denotes the intermediate processing value of the signal $S_2$ received by the $i^{th}$ receiving antenna, $r_i(t)$ denotes a signal received by the ith receiving antenna at a first time slot t, $r_i(t+1)$ denotes a signal received by the $i^{th}$ receiving antenna at a second time slot t+1, $\hat{h}_{ij}$ denotes a channel gain estimate value between the ith receiving antenna and a $j^{th}$ transmitting antenna, and ( )* denotes a complex conjugate.

7. The method of claim 1, wherein the transmitted signal is modulated in a quadrature amplitude modulation method.

8. A receiver for receiving, a transmitted signal through a plurality of receiving antennas, converting the signal to a predetermined symbol, and decoding the signal in a multiple input multiple output system having the plurality of receiving antennas and a plurality of transmitting antennas when the signal of predetermined data is transmitted through a plurality of transmitting antennas based on an Alamouti space-time encoding method, the receiver comprising:
   a channel estimator for estimating channel information including a channel gain of a channel of the transmitted signal;
   a combiner for generating an intermediate processing value for decoding the signal based on the estimated channel information and the symbol; and
   a decoder for normalizing the intermediate value with the channel gain to generate the reference value of the received signal, setting the reference value as a soft-decision value for decoding the signal, decoding the signal based on the soft-decision value, and restoring original data of the signal,
   wherein the intermediate processing value is a summation from 1 to M, and wherein M is a number of the plurality of the receiving antennas.

9. A receiver for receiving a transmitted signal through a plurality of receiving antennas, converting the signal to a predetermined symbol, and decoding the signal in a multiple input multiple output system having the plurality of receiving antennas and a plurality of transmitting antennas when the signal of predetermined data is transmitted through a plurality of transmitting antennas based on an Alamouti space-time encoding method, the receiver comprising:

a channel estimator for estimating channel information including a channel gain of a channel of the transmitted signal;

a combiner for generating an intermediate processing value for decoding the signal based on the estimated channel information and the symbol; and a decoder for generating a reference value based on the intermediate processing value, generating a hard-decision value based on the reference value, and decoding the signal based on the hard-decision value, wherein the decoder comprises:

a reference value generating module for normalizing the intermediate processing value with the channel gain to generate the reference value of the signal;

a constellation point generating module for generating a constellation point imaginary number that is closest to an imaginary number of the reference value and a constellation point real number that is closest to a real number of the reference value;

a hard-decision value setting module for setting the constellation point imaginary number as a hard-decision value of an imaginary number of the signal and the constellation point real number as a hard-decision value of a real number of the signal; and a decoding module for decoding the signal based on the hard-decision values of the imaginary and real numbers to restore original data.

10. The receiver of claim 9, wherein, when the number of transmitting antennas is 2, and $S_1$ and $S_2$ respectively denote signals transmitted through the respective transmitting antennas, the reference values of the signals are generated as shown in the following math figure:

$$y_1 = \frac{v_1}{\sum_{i=1}^{M} \left(|\hat{h}_{i1}|^2 + |\hat{h}_{i2}|^2\right)}$$

$$y_2 = \frac{v_2}{\sum_{i=1}^{M} \left(|\hat{h}_{i1}|^2 + |\hat{h}_{i2}|^2\right)},$$

where $y_1$ denotes the reference value of the signal $S_1$ received by an $i^{th}$ receiving antenna, $y_2$ denotes the reference value of the signal $S_2$ received by the $i^{th}$ receiving antenna, $v_1$ denotes the intermediate processing value of the signal $S_1$ received by the $i^{th}$ receiving antenna, $v_2$ denotes the intermediate processing value of the signal $S_2$ received by the $i^{th}$ receiving antenna, and $\hat{h}_{ij}$ denotes a channel gain estimate value between the $i^{th}$ receiving antenna and a $j^{th}$ transmitting antenna.

11. The receiver of claim 9, wherein, when the number of transmitting antennas is 2, $S_1$ and $S_2$ respectively denote signals transmitted through the respective transmitting antennas, and $y_1$, and $y_2$ respectively denote the reference values of the respective signals, the hard-decision values of the signals are generated as shown in the following math figure:

Hard decision value on real number of $S_1$=Real number constellation point close to real number of $y_1$;

Hard decision value on imaginary number of $S_1$=Imaginary number constellation point close to imaginary number of $y_1$;

Hard decision value on real number of $S_2$=Real number constellation point close to real number of $y_2$;

Hard decision value on imaginary number of $S_2$=Imaginary number constellation point close to imaginary number of $y_2$.

12. The receiver of claim 8, wherein, when the number of transmitting antennas is 2, and $S_1$ and $S_2$ respectively denote signals transmitted through the respective transmitting antennas, the reference values of the signals are generated as shown in the following math figure:

$$y_1 = \frac{v_1}{\sum_{i=1}^{M} \left(|\hat{h}_{i1}|^2 + |\hat{h}_{i2}|^2\right)}$$

$$y_2 = \frac{v_2}{\sum_{i=1}^{M} \left(|\hat{h}_{i1}|^2 + |\hat{h}_{i2}|^2\right)},$$

where $y_1$ denotes the reference value of the signal $S_1$ received by an $i^{th}$ receiving antenna, $y_2$ denotes the reference value of the signal $S_2$ received by the $i^{th}$ receiving antenna, $v_1$ denotes the intermediate processing value of the signal $S_1$ received by the $i^{th}$ receiving antenna, $v_2$ denotes the intermediate processing value of the signal $S_2$ received by the $i^{th}$ receiving antenna, and $\hat{h}_{ij}$ denotes a channel gain estimate value between the $i^{th}$ receiving antenna and a $j^{th}$ transmitting antenna.

13. The method of claim 2, wherein the intermediate processing value of the signal is generated as shown in the following math figure:

$$v_1 = \sum_{i=1}^{M} \left(\hat{h}_{i1}^* r_i(t) + \hat{h}_{i2} r_i^*(t+1)\right)$$

$$v_2 = \sum_{i=1}^{M} \left(\hat{h}_{i2}^* r_i(t) + \hat{h}_{i1} r_i^*(t+1)\right),$$

where $v_1$ denotes the intermediate processing value of the signal $S_1$ received by the $i^{th}$ receiving antenna, $v_2$ denotes the intermediate processing value of the signal $S_2$ received by the $i^{th}$ receiving antenna, $r_i(t)$ denotes a signal received by the ith receiving antenna at a first time slot t, $r_i(t+1)$ denotes a signal received by the $i^{th}$ receiving antenna at a second time slot t+1, $\hat{h}_{ij}$ denotes a channel gain estimate value between the ith receiving antenna and a $j^{th}$ transmitting antenna, and ( )* denotes a complex conjugate.

14. The method of claim 3, wherein the intermediate processing value of the signal is generated as shown in the following math figure:

$$v_1 = \sum_{i=1}^{M} \left(\hat{h}_{i1}^* r_i(t) + \hat{h}_{i2} r_i^*(t+1)\right)$$

-continued $$v_2 = \sum_{i=1}^{M} \left(\hat{h}_{i2}^* r_i(t) + \hat{h}_{i1} r_i^*(t+1)\right),$$

where $v_1$ denotes the intermediate processing value of the signal $S_1$ received by the $i^{th}$ receiving antenna, $v_2$ denotes the intermediate processing value of the signal $S_2$ received by the $i^{th}$ receiving antenna, $r_i(t)$ denotes a signal received by the ith receiving antenna at a first time slot t, $r_i(t+1)$ denotes a signal received by the $i^{th}$ receiving antenna at a second time slot t+1, $\hat{h}_{ij}$ denotes a channel gain estimate value between the ith receiving antenna and a $j^{th}$ transmitting antenna, and ( )* denotes a complex conjugate.

15. The method of claim 4, wherein the intermediate processing value of the signal is generated as shown in the following math figure:

$$v_1 = \sum_{i=1}^{M} \left(\hat{h}_{i1}^* r_i(t) + \hat{h}_{i2} r_i^*(t+1)\right)$$

$$v_2 = \sum_{i=1}^{M} \left(\hat{h}_{i2}^* r_i(t) + \hat{h}_{i1} r_i^*(t+1)\right),$$

where $v_1$ denotes the intermediate processing value of the signal $S_1$ received by the $i^{th}$ receiving antenna, $v_2$ denotes the intermediate processing value of the signal $S_2$ received by the $i^{th}$ receiving antenna, $r_i(t)$ denotes a signal received by the ith receiving antenna at a first time slot t, $r_i(t+1)$ denotes a signal received by the $i^{th}$ receiving antenna at a second time slot t+1, $\hat{h}_{ij}$ denotes a channel gain estimate value between the ith receiving antenna and a $j^{th}$ transmitting antenna, and ( )* denotes a complex conjugate.

16. The method of claim 2, wherein the transmitted signal is modulated in a quadrature amplitude modulation method.

17. The method of claim 3, wherein the transmitted signal is modulated in a quadrature amplitude modulation method.

18. The method of claim 4, wherein the transmitted signal is modulated in a quadrature amplitude modulation method.

* * * * *